United States Patent
Kramer et al.

(10) Patent No.: US 12,502,033 B2
(45) Date of Patent: Dec. 23, 2025

(54) COOKING SYSTEMS WITH IMPROVED HEATING CONSISTENCY

(71) Applicant: SharkNinja Operating LLC, Needham, MA (US)

(72) Inventors: Ethan S. Kramer, Allston, MA (US); Ehab Al Khatib, San Jose, CA (US); Arushi Singh, Newton, MA (US); Alex T. Gushulak, Cambridge, MA (US)

(73) Assignee: SharkNinja Operating LLC, Needham, MA (US)

( * ) Notice: Subject to any disclaimer, the term of this patent is extended or adjusted under 35 U.S.C. 154(b) by 912 days.

(21) Appl. No.: 17/730,049

(22) Filed: Apr. 26, 2022

(65) Prior Publication Data

US 2023/0148795 A1 May 18, 2023

Related U.S. Application Data

(60) Provisional application No. 63/278,768, filed on Nov. 12, 2021.

(51) Int. Cl.
*A47J 37/08* (2006.01)
*G05B 13/02* (2006.01)

(52) U.S. Cl.
CPC ......... *A47J 37/0835* (2013.01); *G05B 13/021* (2013.01)

(58) Field of Classification Search
CPC ...... A47J 37/0835; A47J 36/32; A47J 36/321; A47J 37/0629; G05B 13/021; G05B 2219/2643; G05B 15/02
See application file for complete search history.

(56) References Cited

U.S. PATENT DOCUMENTS 7,426,885 B2 9/2008 Mclemore et al.
7,703,389 B2 4/2010 Mclemore et al.
(Continued)

FOREIGN PATENT DOCUMENTS

AU 2016297715 A1 3/2017
AU 2016216635 A1 5/2017
(Continued)

*Primary Examiner* — Robert G Bachner
(74) *Attorney, Agent, or Firm* — Mintz, Levin, Cohn, Ferris, Glovsky and Popeo, P.C. US

(57) ABSTRACT

Cooking systems with improved heating consistency and corresponding methods are provided. A cooking system includes a cooking compartment for receiving food, and a control system for controlling food cooking therein. The control system stores multiple heating times corresponding to different user inputs (e.g., a food shade, a food type, a cooking mode, etc.) The control system can determine temperatures of the cooking compartment from the past to present, as well as a temperature change between the past and present. When the cooking system is activated, the control system receives the user inputs and selects a stored heating time based upon these user inputs and the present cooking compartment temperature. At certain present temperatures, the cooking system also selects the stored heating time based upon the temperature change. This allows the controller to adjust the heating time based upon the cooking compartment temperature, and optionally temperature change, to avoid overcooking food.

23 Claims, 15 Drawing Sheets

(56) References Cited

U.S. PATENT DOCUMENTS

| | | |
|---|---|---|
| 8,109,263 B2 | 2/2012 | Pliml |
| 9,441,838 B2 | 9/2016 | Baker |
| 9,883,770 B2 | 2/2018 | Hunt et al. |
| 10,021,887 B2 | 7/2018 | Mclemore et al. |
| 10,045,546 B2 | 8/2018 | Giebel et al. |
| 10,292,531 B1 | 5/2019 | Hancock et al. |
| 10,327,584 B2 | 6/2019 | Shingler et al. |
| 10,327,588 B2 | 6/2019 | Dahle et al. |
| 10,327,589 B1 | 6/2019 | Dahle et al. |
| 10,455,979 B2 | 10/2019 | Colston et al. |
| 10,478,016 B2 | 11/2019 | Mclemore et al. |
| 10,588,461 B2 | 3/2020 | Dahle |
| 10,660,473 B2 | 5/2020 | Dahle et al. |
| 10,674,866 B2 | 6/2020 | Colston |
| 10,694,892 B2 | 6/2020 | Colston |
| 10,772,467 B2 | 9/2020 | Dahle |
| 10,888,193 B2 | 1/2021 | Dahle et al. |
| 10,952,564 B2 | 3/2021 | Dahle et al. |
| 10,959,572 B2 | 3/2021 | Dahle et al. |
| 10,986,960 B2 | 4/2021 | Colston |
| 10,995,964 B2 | 5/2021 | Dahle |
| 11,162,684 B2 | 11/2021 | Colston et al. |
| 11,172,688 B2 | 11/2021 | Powell et al. |
| 11,181,276 B2 | 11/2021 | Colston et al. |
| 11,181,277 B2 | 11/2021 | Donnelly et al. |
| 11,206,948 B2 | 12/2021 | Measom et al. |
| 2015/0114237 A1* | 4/2015 | Abukashef .......... A47J 37/0857 99/393 |
| 2018/0168397 A1 | 6/2018 | Colston |
| 2019/0290064 A1 | 9/2019 | Colston et al. |
| 2019/0290069 A1 | 9/2019 | Colston et al. |
| 2019/0320669 A1 | 10/2019 | Powell et al. |
| 2020/0093145 A1 | 3/2020 | Powell et al. |
| 2020/0116349 A1 | 4/2020 | Rahmani et al. |
| 2020/0214501 A1 | 7/2020 | Gafford et al. |
| 2020/0214503 A1 | 7/2020 | Altenritter |
| 2020/0237139 A1 | 7/2020 | Colston |
| 2020/0275804 A1 | 9/2020 | Dahle |
| 2021/0007550 A1 | 1/2021 | Puertas et al. |
| 2021/0052108 A1 | 2/2021 | Dahle |
| 2021/0169269 A1 | 6/2021 | Meadows et al. |
| 2021/0196078 A1 | 7/2021 | Colston et al. |
| 2021/0196079 A1 | 7/2021 | Dahle et al. |
| 2021/0228020 A1 | 7/2021 | Hanks et al. |
| 2021/0235927 A1 | 8/2021 | Colston |
| 2021/0244233 A1 | 8/2021 | Bush et al. |
| 2021/0251423 A1 | 8/2021 | Dahle et al. |
| 2021/0282590 A1 | 9/2021 | Dahle et al. |
| 2021/0302027 A1 | 9/2021 | Dahle |
| 2021/0315416 A1 | 10/2021 | Fullmer et al. |
| 2021/0352923 A1 | 11/2021 | Li et al. |
| 2021/0369052 A1 | 12/2021 | Fullmer et al. |

FOREIGN PATENT DOCUMENTS

| | | |
|---|---|---|
| AU | 2018251790 A1 | 10/2019 |
| AU | 2019202070 A1 | 10/2019 |
| AU | 2019202071 A1 | 10/2019 |
| AU | 2019202074 A1 | 10/2019 |
| AU | 2019202075 A1 | 10/2019 |
| AU | 2019342959 A1 | 4/2021 |
| CA | 2941277 A1 | 4/2017 |
| CA | 3037207 A1 | 3/2019 |
| CA | 3037934 A1 | 9/2019 |
| CA | 3037936 A1 | 9/2019 |
| CA | 3038088 A1 | 9/2019 |
| CA | 3066299 A1 | 7/2020 |
| CN | 203852233 U | 10/2014 |
| CN | 205391021 U | 7/2016 |
| CN | 107529920 A | 1/2018 |
| CN | 110353518 A | 10/2019 |
| CN | 110353519 A | 10/2019 |
| CN | 110353520 A | 10/2019 |
| CN | 110353525 A | 10/2019 |
| CN | 111493681 A | 8/2020 |
| CN | 106998964 B | 10/2021 |
| DE | 212016000022 U1 | 8/2017 |
| DE | 212016000157 U1 | 3/2018 |
| DE | 102019107552 A8 | 3/2020 |
| EP | 1517093 B1 | 7/2006 |
| EP | 1514502 B1 | 12/2006 |
| EP | 2605690 B1 | 11/2014 |
| EP | 2433530 B1 | 12/2014 |
| EP | 3364838 A4 | 5/2019 |
| EP | 3677157 A1 | 7/2020 |
| EP | 3375335 B1 | 8/2020 |
| EP | 3865031 A1 | 8/2021 |
| GB | 2555054 A | 4/2018 |
| GB | 2558532 A | 7/2018 |
| GB | 2572489 A | 10/2019 |
| GB | 2572491 A | 10/2019 |
| GB | 2572492 A | 10/2019 |
| JP | 2018526036 A | 9/2018 |
| KR | 20180039541 A | 4/2018 |
| KR | 20180067383 A | 6/2018 |
| WO | 2021138455 A4 | 9/2021 |

* cited by examiner

COOKING SYSTEMS WITH IMPROVED HEATING CONSISTENCY

CROSS-REFERENCE TO RELATED APPLICATIONS

This application claims priority to U.S. Provisional Application No. 63/278,768 filed Nov. 12, 2021 and entitled, "Cooking Systems with Improved Heating Consistency," the entire contents of which are hereby expressly incorporated by reference herein.

FIELD

Cooking systems and methods are provided for cooking food that utilizes a control system for controlling cooking of food in a cooking compartment.

BACKGROUND

Existing countertop cooking systems, such as toasters, may be used to conveniently warm or cook food. A user can insert food into an opening of a toaster, select one or more cooking settings, and activate the toaster to begin heating the food. These cooking systems can further provide a selector that is configured to allow a user to select one or more cooking settings for the food.

In these existing cooking systems, cooking is performed for a heating time that is constant and determined by the cooking setting(s) selected by the user. These heating times are set by the manufacturer and are based upon an assumed temperature of the cooking system when the cooking cycle is started (e.g., room temperature). However, under circumstances where the cooking system is used to warm or cook food two or more times in succession, the temperature of the cooking system at the start of second and subsequent cooking cycles is significantly higher than room temperature. That is, the temperature assumption upon which the heating time is based is not correct. As a result, the heating time can be too long, overcooking the food (e.g., burning toast) and leading to user dissatisfaction. Furthermore, while the cooking cycle can be manually halted by the user to prevent overcooking under these circumstances, this requires deliberate user intervention and does not promote ease of use.

SUMMARY

It is therefore desirable to develop a cooking system that can adjust the heating time for one or more input cooking settings based upon the temperature of the cooking system. Accordingly, cooking systems and methods are provided for cooking food, and in particular, embodiments of the systems and methods can utilize a control system for controlling a cooking time for food in a cooking compartment.

In one embodiment, a cooking system is provided and includes a housing and a control system. The housing can include a cooking compartment, at least one heating element, and at least one temperature sensor. The cooking compartment can be configured to receive a food item therein. The at least one heating element can be configured to heat the cooking compartment in response to receipt of electrical power from a power supply. The at least one temperature sensor can be configured to measure the temperature within the cooking compartment and to output temperature signals containing data representing the temperature measurement. The control system can be positioned in the housing and can include a controller. The controller can include one or more processors in communication with the at least one temperature sensor and the power supply. The controller can be configured to receive a first temperature signal representing a first measurement of the temperature of the cooking compartment at a first time. The controller can also be configured to receive a second temperature signal representing a second measurement of the temperature of the cooking compartment at a second time, subsequent to the first time. The controller can further be configured to compare the second temperature measurement to a stored temperature threshold. If the second measured temperature is determined to be less than or equal to the temperature threshold, the controller can be further configured to command the power supply to provide electrical power to the at least one heating element for the stored first heating time. if the second measured temperature is determined to be greater than the at least one temperature threshold, the controller can also be configured to command the power supply to provide electrical power to the at least one heating element for a stored second heating time less than the first stored heating time.

In another embodiment, the cooking system can further comprise a memory maintaining the stored first heating time, a plurality of stored second heating times, the temperature threshold, and at least one temperature change threshold. If the second measured temperature is determined to be greater than the temperature threshold, the controller can be further configured to determine a difference between the second measured temperature and the first measured temperature, and identify the stored second heating time from the plurality of stored second heating times by comparing the difference to the at least one temperature change threshold.

In another embodiment, at least one of the plurality of stored second heating times can correspond to a cooking compartment temperature criteria. Identifying the stored second heating time can further include determining that the difference is greater than the temperature change threshold, and identifying the stored second heating time as the second heating time that corresponds to a cooking compartment temperature criteria matching the second measured temperature.

In another embodiment, at least one of the plurality of stored second heating times corresponds to a cooking compartment temperature change criteria. Identifying the stored second heating time can include determining that the difference is less than or equal to the temperature change threshold, and identifying the stored second heating time as the second heating time that corresponds to a cooking compartment temperature change criteria matching the difference.

In another embodiment, the cooking system can include a shade selector configured to receive a selection of one of a plurality of shades, and the controller can be configured to receive, from the shade selector, a selected shade.

In another embodiment, the stored first heating time can include a plurality of stored first heating times, where at least one of the plurality of stored first heating times corresponds to a shade of the plurality of shades. The controller can be further configured to, if the second measured temperature is less than or equal to the temperature threshold, command the power supply to provide electrical power to the at least one heating element for the stored first heating time corresponding to a shade matching the selected shade.

In another embodiment, at least one of the plurality of stored second heating times can correspond to a cooking compartment temperature criteria and a shade. Identifying the stored second heating time can include determining that the difference is greater than the temperature change threshold, and identifying the stored second heating time as the second heating time that corresponds to both a cooking compartment temperature criteria matching the second measured temperature and a shade matching the selected shade.

In another embodiment, at least one of the plurality of stored second heating times can correspond to a cooking compartment temperature change criteria and a shade. Identifying the stored second heating time can include determining that the difference is less than or equal to the temperature change threshold, and identifying the stored second heating time as the second heating time that corresponds to both a cooking compartment temperature change criteria matching the difference and a shade matching the selected shade.

In another embodiment, the cooking system can include a food item selector configured to receive a selection of one of a plurality of food items to be cooked. The controller can be further configured to receive, from the food item selector, a food item selection.

In another embodiment, the stored first heating time can include a plurality of stored first heating times, where at least one of the plurality of stored first heating times corresponds to an food item of the plurality of food items. The controller can be further configured to, if the second measured temperature is less than or equal to the temperature threshold, command the power supply to provide electrical power to the at least one heating element for the stored first heating time corresponding to a food item matching the selected food item.

In another embodiment, at least one of the plurality of stored second heating times can correspond to a cooking compartment temperature criteria and a food item. Identifying the stored second heating time can include determining that the difference is greater than the temperature change threshold, and identifying the stored second heating time as the second heating time that corresponds to both a cooking compartment temperature criteria matching the second measured temperature and a food item that matches the selected food item.

In another embodiment, at least one of the plurality of stored second heating times can correspond to a cooking compartment temperature change criteria and a food item. Identifying the stored second heating time can include determining that the difference is less than or equal to the temperature change threshold, and identifying the stored second heating time as the second heating time that corresponds to both a cooking compartment temperature change criteria matching the difference and a food item that matches the selected food item.

In another embodiment, the controller can be further configured to output the stored heating time commanded by the controller to the power supply to a display.

In other aspects, a cooking method is provided. The method can include receiving, by a controller including one or more processors, a first temperature signal representing a first measurement of a temperature of a cooking compartment of a cooking system at a first time and a second temperature signal representing a second measurement of the temperature of the cooking compartment at a second time, subsequent to the first time. The method can further include comparing, by the controller, the second temperature measurement to a stored temperature threshold. The method can additionally include, if the controller determines the second measured temperature to be less than or equal to the temperature threshold, commanding a power supply to provide electrical power to at least one heating element in thermal communication with the cooking compartment for the stored first heating time. The method can also include, if the controller determines the second measured temperature to be greater than the temperature threshold, commanding the power supply to provide electrical power to the at least one heating element for a stored second heating time less than the stored first heating time.

In one embodiment, the cooking method also includes storing, in a memory, the stored first heating time, a plurality of stored second heating times, the temperature threshold, and at least one temperature change threshold. If the controller determines the second temperature to be greater than the temperature threshold, the method further can include determining a difference between the second measured temperature and the first measured temperature and identifying the stored second heating time from the plurality of stored second heating times by comparing the difference to the at least one temperature change threshold.

In another embodiment, at least one of the plurality of stored second heating times can correspond to a cooking compartment temperature criteria. Identifying the stored second heating time includes determining that the difference is greater than the temperature change threshold, and identifying the stored second heating time as the second heating time that corresponds to a cooking compartment temperature criteria matching the second measured temperature.

In another embodiment, at least one of the plurality of stored second heating times can correspond to a cooking compartment temperature change criteria. Identifying the stored second heating time can further include determining that the difference is less than or equal to the temperature change threshold, and identifying the stored second heating time as the second heating time that corresponds to a cooking compartment temperature change criteria matching the difference.

In another embodiment, the method can further include receiving, by the controller, a shade selected from one of a plurality of shades.

In another embodiment, the stored first heating time can include a plurality of stored first heating times, where at least one of the plurality of stored first heating times corresponds to a shade of the plurality of shades. The method can further include by the controller, determining that the second measured temperature is less than or equal to the temperature threshold, and commanding the power supply to provide electrical power to the at least one heating element for the stored first heating time corresponding to a shade matching the selected shade.

In another embodiment, at least one of the plurality of stored second heating times can correspond to a cooking compartment temperature criteria and a shade. Identifying the stored second heating time can further include, by the controller, determining that the difference is greater than the temperature change threshold, and identifying the stored second heating time as the second heating time that corresponds to both a cooking compartment temperature criteria matching the second measured temperature and a shade matching the selected shade.

In another embodiment, at least one of the plurality of stored second heating times can correspond to a cooking compartment temperature change criteria and a shade. Identifying the stored second heating time can further include, by the controller, determining that the difference is less than or equal to the temperature change threshold, and identifying the stored second heating time as the second heating time that corresponds to both a cooking compartment temperature change criteria matching the difference and a shade matching the selected shade.

In another embodiment, the method can further include receiving, by the controller, a food item selection from a plurality of food items to be cooked.

In another embodiment, the stored first heating time can include a plurality of stored first heating times, and at least one of the plurality of stored first heating times can correspond to a food item of the plurality of food items. The method can additional include, by the controller, determining that the second measured temperature is less than or equal to the temperature threshold, and commanding the power supply to provide electrical power to the at least one heating element for the stored first heating time corresponding to an article matching the selected article.

In another embodiment, at least one of the plurality of stored second heating times can corresponds to a cooking compartment temperature criteria and a food item. Identifying the stored second heating time can include, by the controller, determining that the difference is greater than the temperature change threshold, and identifying the stored second heating time as the second heating time that corresponds to both a cooking compartment temperature criteria matching the second measured temperature and a food item that matches the selected food item.

In another embodiment, at least one of the plurality of stored second heating time corresponds to a cooking compartment temperature change criteria and a food item. Identifying the stored second heating time can include, by the controller: determining that the difference is less than or equal to the temperature change threshold, and identifying the stored second heating time as the second heating time that corresponds to both a cooking compartment temperature change criteria matching the difference and a food item that matches the selected food item.

In another embodiment, the controller can be further configured to output the stored heating time commanded by the controller to the power supply to a display.

DESCRIPTION OF DRAWINGS

The accompanying drawings incorporated in and forming a part of the specification embodies several aspects of the present disclosure and, together with the description, serves to explain the principles of the disclosure. In the drawings.

The detailed description explains embodiments of the disclosure, together with advantages and features, by way of example with reference to the drawings.

DETAILED DESCRIPTION

In general, a cooking system is provided having a cooking compartment for receiving food, and having a control system for controlling cooking time for food in the compartment. The control system can store a variety of heating times corresponding to different user inputs (e.g., color or shade desired for the food, a type of food, a cooking mode such as bake, broil, defrost, etc.) The control system can further determine temperatures of the cooking compartment from the past to present, as well as a temperature change of the cooking compartment between the past and present. When the cooking system is activated to cook food, the control system can receive user inputs and select a stored heating time based upon these user inputs and the present cooking compartment temperature. If the present temperature is above a threshold temperature, the control system can further use the temperature change of the cooking compartment when selecting the stored heating time. Beneficially, this allows the controller to adjust the heating time based upon the cooking compartment temperature, alone or in combination with temperature changes of the cooking compartment, and avoid overcooking food.

Figure 1:
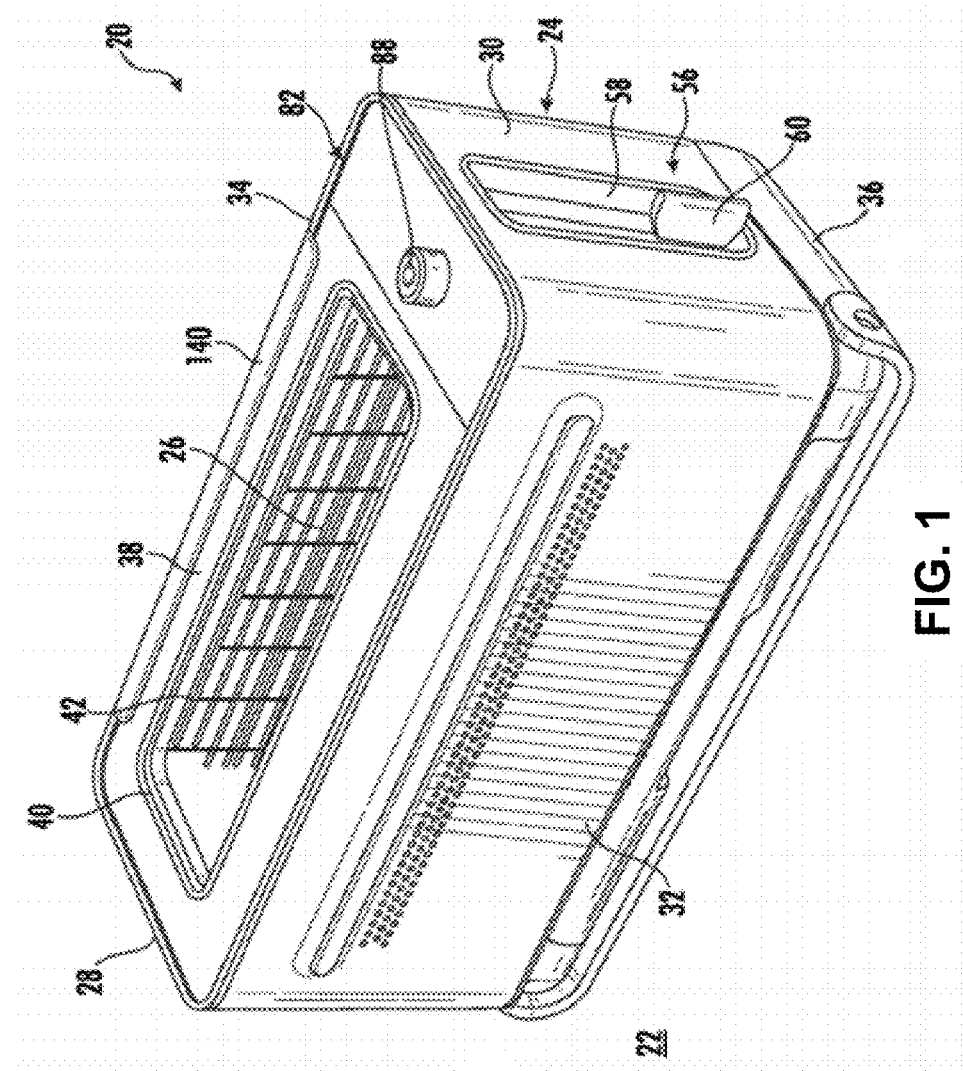
FIG. 1 is a front perspective view of a cooking system of according to one embodiment.
Figure 2:
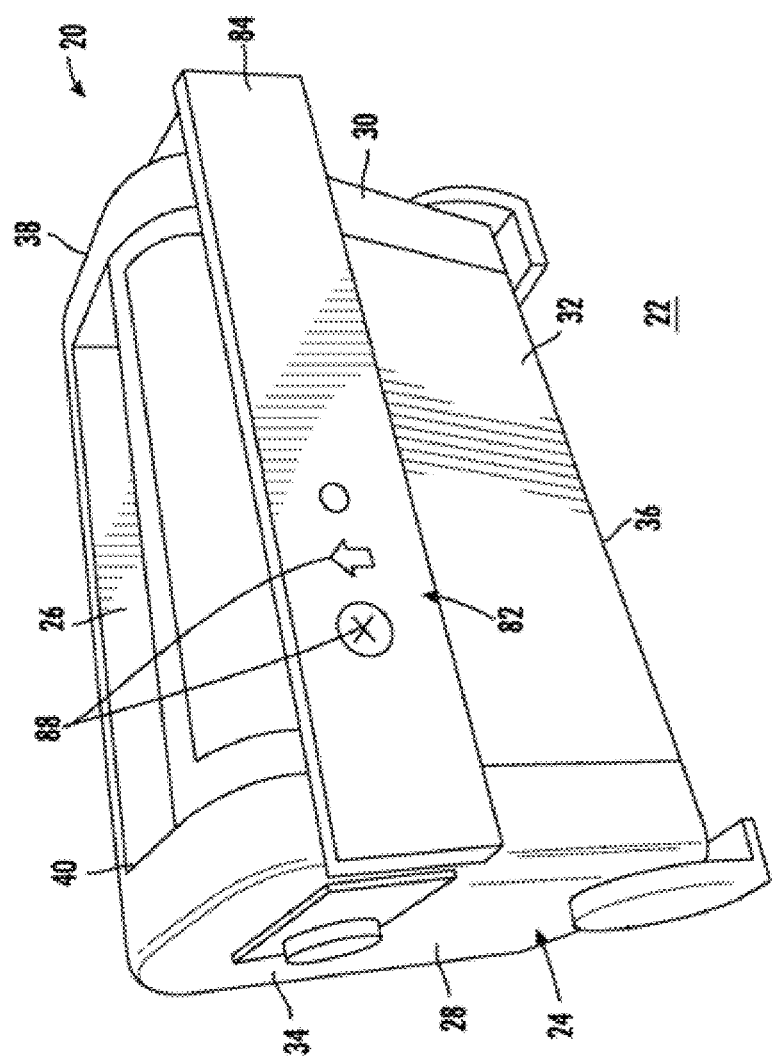
FIG. 2 is a rear perspective view of the cooking system of FIG. 1.
Figure 3:
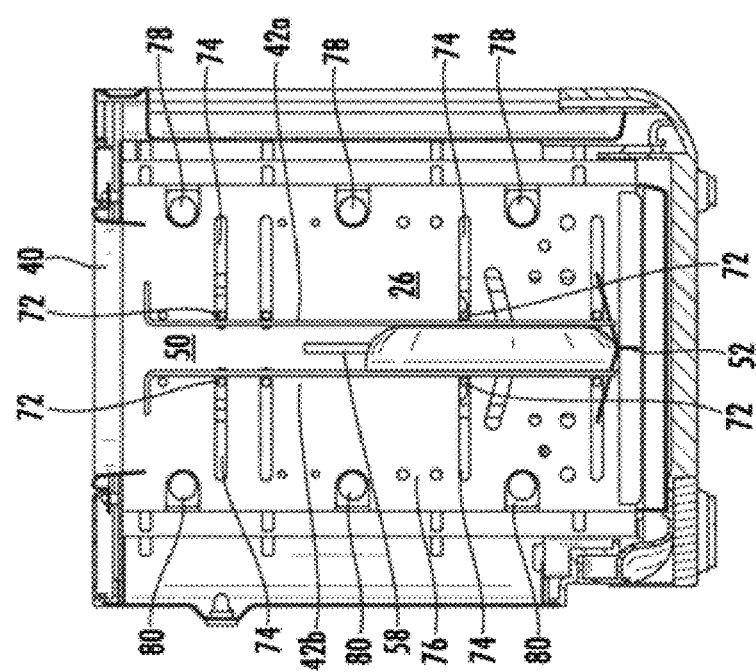
FIG. 3 is a side cross-sectional view of the cooking system of FIG. 1.

FIGS. 1-3 illustrate one embodiment of a cooking system 20. As shown, the cooking system 20 generally includes a thermally insulated housing 24 having a left side 28, a right side 30, a front 32, a back 34, and a bottom 36 connected to one another to define a cooking compartment or cooking volume 26 therein. The housing 24 additionally includes a top 38 through which the cooking compartment 26 is accessed by a user. The top 38 of the housing 24 may extend between the left and right sides 28, 30, respectively, and between the front 32 and the back 34, respectively. An opening 40 for providing access to the cooking compartment 26 of the housing 24 can be formed in the top 38. However, it should be understood that embodiments where the cooking compartment 26 is accessed on another side, or where the housing 24 does not include a top 38, or alternatively includes an at least partially movable top 38, such as a door for example, are also within the scope of the disclosure. In general, the cooking system 20 can be configured for use on a support surface 22, such as a countertop. However, further embodiments of the disclosed cooking system can adopt other form factors, as desired. Further, the housing 24 is illustrated and described herein as an external housing of the cooking system 20. As a result, one or more radiant cases may be located between an interior surface of the housing 24 and the cooking compartment 26. However, it should be understood that, in other embodiments, the housing 24 described herein may alternatively refer to an internal housing disposed within a separate external case or housing.

As further shown in FIGS. 1-3, the cooking system 20 can include at least one food support element 42 that is operable to position and retain a food item in the cooking compartment 26. In the illustrated embodiment, the at least one food support element 42 includes a first food support element 42a positioned within the cooking compartment 26 generally adjacent to a first interior surface thereof and a second food support element 42b positioned within the cooking compartment 26 generally adjacent to an opposite, second interior surface thereof. The first and second food support elements 42a, 42b can cooperate to form a cage. A gap 50 for receiving a food item is defined between the first food support element 42a and the second food support element 42b. At least one of the first food support element 42a and the second food support element 42b defines a support surface operable to contact a surface of a food item installed within the gap 50.

The first and second food support elements 42a, 42b may be formed from any suitable thermally conductive material, such as metal, and more specifically wire for example. Further, a configuration of the first and second food support elements 42a, 42b may be substantially identical, or alternatively may be different. It should be understood that the at least one food support element 42 illustrated and described herein is intended as an example only. A cooking system having any number and/or configuration of food support elements arranged within the internal cooking compartment, such as a single food support element or more than two food support elements for example, are also within the scope of the disclosure.

A support bar or member 52 can also be arranged within the cooking compartment 26 and can be configured to support a food item against gravity. As shown, the support member 52 may extend across the internal cooking compartment 26, between the left side 28 and the right side 30 for example, and may additionally span the gap 50 defined between the first and second food support elements 42a, 42b. It should be understood that the support member 52 illustrated and described herein is intended as an example only, and that a support member having another configuration, is also within the scope of the disclosure.

A movement mechanism 56 may be used to move the support member 52 within the cooking compartment 26 between an inactive position, such as near the opening 40 for example, and an active position, for example near the bottom 36 of the housing 24. Transformation of the support member 52 from the inactive position to the active position is configured to locate a substantial entirety of a food item within the cooking compartment 26, in the gap 50 defined between the food support elements 42. Further, in some embodiments, the movement mechanism 56 may be operable to transform the support member 52 from the active position to the inactive position in order to substantially remove a food item from the cooking compartment 26. A distance between the support member 52 and the opening 40 may be greater when in the active position than when the support member 52 is in the inactive position.

In an embodiment, a user may manually translate the support member 52 within the cooking compartment 26 via the movement mechanism 56. An example of such a manual movement mechanism 56 is a load/eject lever. The manual movement mechanism 56 is movable relative to the housing 24, for example translatable within a slot 58 formed at a respective side of the housing 24. In the illustrated, non-limiting embodiment, a first portion of the manual movement mechanism 56 is directly or indirectly connected to the support member 52 and another portion of the manual movement mechanism 56, such as a paddle 60 for example, is arranged adjacent an exterior of the housing 24 and forms a user interface of the movement mechanism 56. The movement mechanism 56 additionally includes a rod (not shown) oriented parallel to the slot 58. The rod defines an axis of translation of the movement mechanism 56. To operate the movement mechanism 56, a user applies a force to the paddle 60 to cause the manual movement mechanism 56, and therefore the support member 52, to move from the inactive position to the active position.

In an alternative embodiment, not shown, the movement mechanism may be configured to automatically move the support member between the inactive and the active position in response to a user input. In such embodiments, the movement mechanism may include a motor or other actuation device operably coupled to the support member. An input configured to operate the motor, such as a button for example, may be located at the exterior of the housing, for access by a user. In response to application of a force to the input by a user, the motor may cause the support member to translate along the axis defined by the rod.

In use, the gap 50 defined between the first and second food support elements 42a, 42b is configured to change in response to movement of the support member 52 within the cooking compartment 26. For example, when the support member 52 is in the inactive position, the gap 50 can be a neutral gap that can be generally uniform over the height of the food support elements 42a, 42b. In an exemplary embodiment, the neutral gap can be approximately 35 mm. When the support member 52 is lowered to the active position, at least one of the first and second food support elements 42a, 42b is moved to reduce the gap 50 as compared to the neutral gap and restrict movement of a food item positioned between the food support elements 42a, 42b.

This movement of at least one of the food support elements 42a, 42b may be driven by the support member 52. As shown in FIG. 3, a post or other elongated member 72 associated with a corresponding food support element 42 is positioned within one or more slots or openings 74 formed in a panel or portion of a radiant casing, identified at 76, adjacent a side of the cooking compartment 26. The at least one post 72 may be integrally formed with the food support element 42a, 42b, or alternatively, may be part of a separate component connected to a food support element 42a, 42b.

As the support member 52 moves between the inactive and active positions, one or more of the posts 72 is configured to translate within a respective opening 74. As illustrated, the openings 74 associated with the upper and lower posts 72 have a generally horizontal orientation and are parallel to one another. Accordingly, the food support elements 42a, 42b are oriented generally parallel when the support member 52 is in both the inactive and active positions. In such embodiments, the gap 50 is generally constant over the height of the food support elements 42a, 42b when the support member 52 is in both the inactive and active positions.

With continued reference to FIG. 3, the cooking system 20 can also include one or more first heating elements 78 positioned within the cooking compartment 26, for example adjacent the back 34 of the housing 24. In the illustrated, non-limiting embodiment, the cooking system 20 includes a plurality of first heating elements 78, such as three first heating elements, oriented horizontally and generally parallel to the front and back 32, 34, and spaced over the height of the cooking compartment 26. It should be understood that any number and configuration of the first heating elements 78 is contemplated herein.

Alternatively, or in addition, at least one second heating element 80 may be positioned within the cooking compartment 26, for example adjacent the front 32 of the housing 24. In the illustrated, non-limiting embodiment, the cooking system 20 includes a plurality of second heating elements 80, such as three second heating elements, oriented generally parallel to the front and back 32, 34 and spaced over the height of the cooking compartment 26. The first heating elements 78 and the second heating elements 80 may be generally aligned, or may be staggered relative to one another.

It should be understood that although the heating elements 78, 80 of the cooking system 20 are illustrated and described as being positioned within the cooking compartment 26 generally adjacent the front 32 and the back 34 of the housing 24, embodiments where the cooking system 20 alternatively or additionally may include one or more heating elements (not shown) located within the cooking compartment adjacent a side 28, 30, or the bottom 36 of the housing, or within a center of the cooking compartment 26 are also contemplated herein. Further, embodiments where one or more of the heating elements 78, 80 extend vertically between the top 38 and bottom 36 are also within the scope of the disclosure. Additionally, it should be understood that the cooking compartment 26 may alternatively, or additionally, be heated by one or more heating elements (not shown) located remotely from the cooking compartment 26.

The one or more heating elements 78, 80 of the cooking system 20 may be selected to perform any suitable type of heating, including but not limited to, conduction, convection, radiation, and induction. Further, the heat output across one or more of the heating elements 78, 80 may vary. In one embodiment, one or more of the heating elements 78, 80 may have a non-uniform construction, for example including a coiled wire arranged within a tube which heats and emits radiation when power is supplied thereto. By varying the spacing between adjacent coils over the length of the heating element 78, 80, the amount of heat emitted at various portions of the heating element 78, 80 may be greater than others. However, embodiments where the heat output by one or more of the heating elements 78, 80 is constant over the length of the heating element are also within the scope of the disclosure.

Further embodiments of the cooking system 20 may include a control panel or user interface 82 for operating the cooking system 20. In one example, illustrated in FIG. 1, the control panel 82 may be mounted to an exterior portion of the housing 24, such as the top 38. Alternatively, as illustrated in FIG. 2, the cooking system 20 may include a component 84 movably mounted to the housing 24, and at least a portion of the control panel 82 may be coupled to or integrated into the movable component 84. In one embodiment, the movable component 84 may be a handle pivotally mounted to opposing sides of the housing 24, such as the left side 28 and the right side 30.

Figure 4:
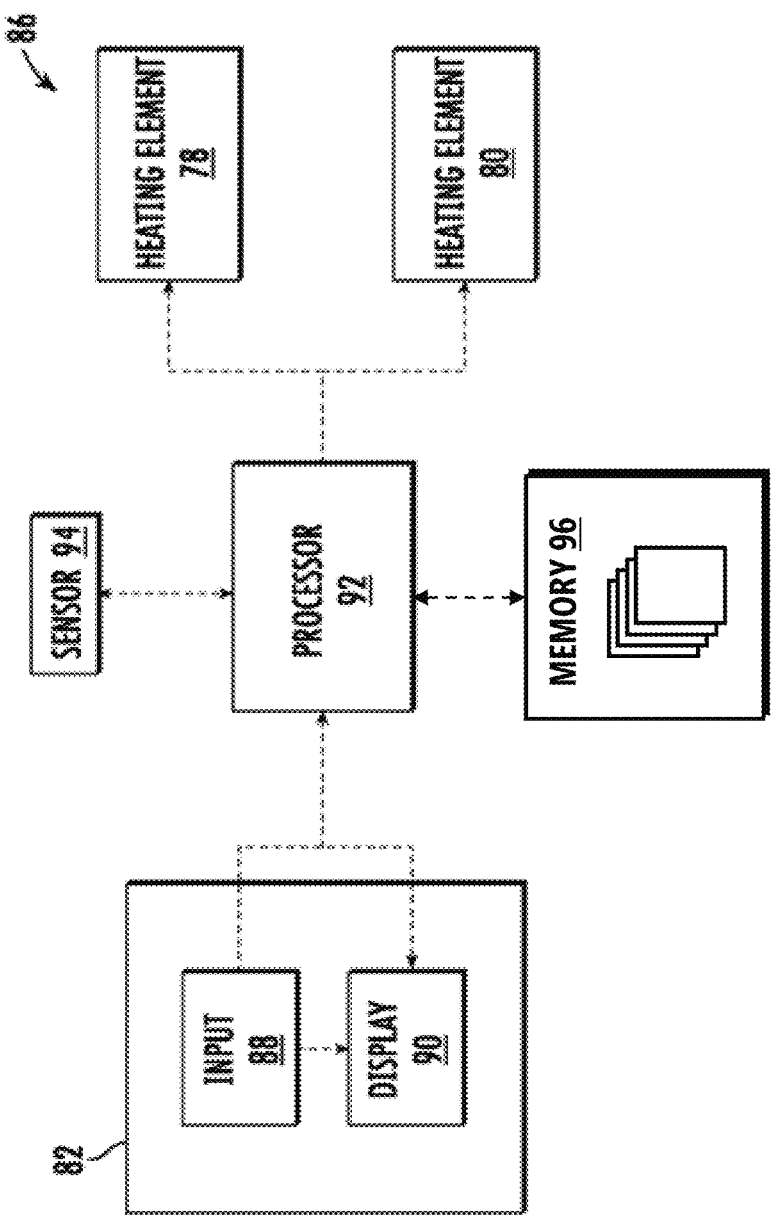
FIG. 4 is a schematic diagram of a control system of the cooking system of FIG. 1.

The control panel 82 is part of a control system 86 that is electrically connected to the one or more heating elements 78, 80. A schematic diagram of the control system 86 is illustrated in FIG. 4. The control panel 82 includes one or more inputs 88 associated with energizing or operation of the one or more heating elements 78, 80 of the cooking system 20 and for selecting various modes of operation of the cooking system 20. One or more of the inputs 88 may include a light or other indicator to show a user that the respective input 88 has been selected. The control panel 82 may additionally include a display 90 separate from and associated with the at least one input 88. However, embodiments where the display and the at least one input are integrated are also contemplated herein.

As further shown in FIG. 4, the control system 86 includes a controller or processor, illustrated schematically at 92 in communication with one or more temperature sensors 94 and a memory 96. As discussed in greater detail below, the controller 92 is configured to control operation of the heating elements 78, 80 using algorithms to execute heating according to stored heating times maintained by the memory 96 and selected based upon inputs received via the one or more inputs 88 and one or more temperature measurements acquired by the temperature sensor(s) 94. In embodiments where the cooking system 20 includes a plurality of heating elements, the heating elements 78, 80 may be independently operable. Further, the heating output of one or more of the heating elements 78, 80 may be variable in response to the power supplied to the heating elements 78, 80.

In one embodiment, the at least one input 88 is operable to select one or more modes of operation of at least one of the heating elements 78, 80. Alternatively, or in addition, at least one input 88 is operable to select a stored sequence of operation of at least one heating element 78, 80. In some cases, the stored sequences may be particularly well suited for a given method of food preparation and/or for particular ingredients or types of ingredients. The plurality of stored sequences associated with the at least one input 88 may be stored within a memory accessible by the processor 92. Alternatively, the plurality of stored sequences may be stored remotely from the cooking system 20, and may be accessed by the processor 92, such as via wireless communication for example.

The at least one input 88 on the control panel 82 can include an on/off button which allows the user to activate or deactivate the control panel 82. When the control panel 82 is deactivated, none of the heating elements 78, 80 are energized. The at least one input 88 may include a distinct start button intended to initiate operation in a desired mode, a distinct stop button to cease all operation, or a stop/start button intended to initiate and cease functions. Alternatively, the cooking system 20 may be operable to automatically start operation after a predetermined time has elapsed once an input has been selected and any necessary information has been provided to the control panel 82. One or more of the other inputs 88, such as a knob for example, may be operable, such as by pushing the knob towards the control panel 82, to start and stop operation of the cooking system 20, regardless of whether the cooking system 20 is following a stored sequence or is in a manual mode.

The one or more inputs 88 are operable to initiate operation of the cooking system 20 in a plurality of cooking modes. Examples of modes of operation of the cooking system 20 include, but are not limited to, one or more of toast, bake, broil, defrost/warm, reheat, and type of food item (e.g., bread, bagel). In further embodiments, the one or more inputs 88 are further operable to select combinations of modes of operation (e.g., toasted bread, defrosted bread, toasted bagel, etc.) In additional embodiments, the one or more inputs 88 are operable to select a browning level or shade in combination with the mode of operation and/or type of food item. In this manner, a user can select a cooking operation, shade and/or type of food item positioned within the cooking compartment 26.

As noted above, existing cooking systems can be configured to determine heating times based only upon user inputs. However, the heating times associated with respective user inputs are fixed and assume that the cooking system begins a cooking cycle at room temperature. It can be appreciated that this assumption is not always correct. For example, when the cooking system is operated to perform multiple cooking cycles in succession, the cooking system at the beginning of the second and subsequent cooking cycles is not at room temperature but at a temperature significantly higher. By failing to account for this temperature difference, under these circumstances, the heating times associated with respective user inputs are not representative of the user's desired degree of cooking (e.g., toast shade) and overcooking can result.

Thus, in order to address this problem, embodiments of the control system 86 (e.g., controller 92) are configured to control operation of the heating elements 78, 80 based on user input provided via the one or more inputs 88 and one or more temperature parameters based upon one or more temperature measurements acquired by the temperature sensor(s) 94. In general, the user inputs allow the processor 92 to identify a first or baseline heating time for use when the cooking compartment 26 is relatively cool, while the temperature parameter(s) allow the processor 92 to determine when the cooking compartment 26 is hot and to identify a second heating time from a plurality of stored heating times for use in lieu of the first heating time. In this manner, the relationship between user inputs and the user's desired degree of cooking is maintained, allowing the cooking system 20 to avoid overcooking and meet user expectations.

Figure 5:
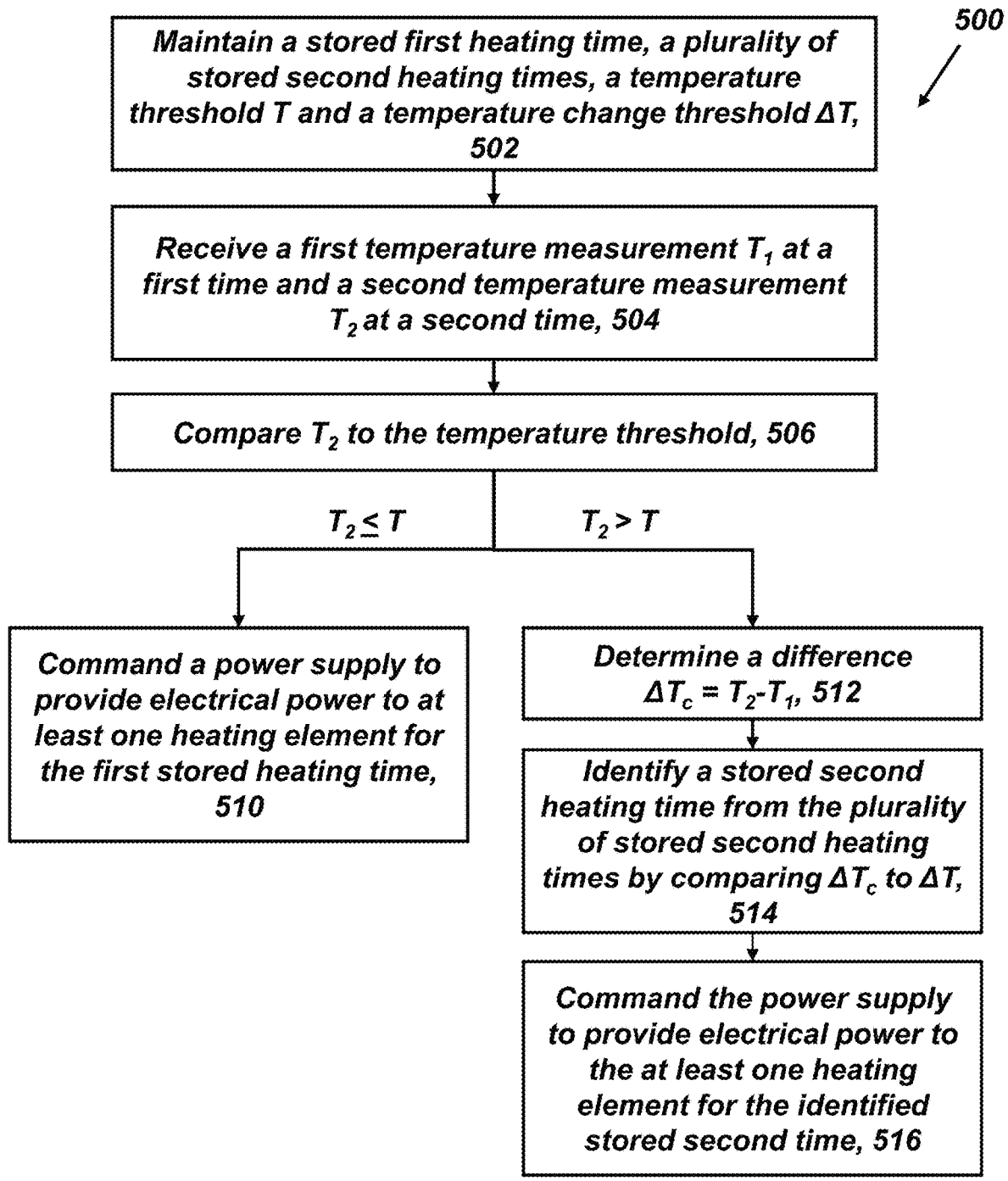
FIG. 5 is a flow diagram of one embodiment of a method of cooking a food item employing the cooking system of FIG. 1.

A method 500 performed by the processor 92 to identify a stored heating time for use in cooking food inserted within the cooking compartment 26 is illustrated in FIG. 5. As shown, the method 500 includes operations 502-516. However, it can be appreciated that in alternative embodiments, the method can include greater or fewer operations and the operations can be performed in a different order than illustrated in FIG. 5.

In operation 502, the memory 96 maintains a stored first heating time, a plurality of stored second heating times, a temperature threshold $\Delta T$, and a temperature change threshold $\Delta T_C$. The stored first heating time represents a baseline or standard heating time for known user inputs when the cooking system 20 is relatively cool. In contrast, the plurality of stored second heating times represent alternative heating time options when the cooking system 20 is relatively hot. As discussed below, additional operations of the method 500 are performed using the temperature threshold $\Delta T$ in combination with temperature measurements from the sensor(s) 94 to determine whether the stored first heating time or one of the plurality of stored second heating times should be employed.

In certain embodiments, the temperature sensor(s) 94 can be configured to output temperature signals at periodic intervals. The temperature signals can be received and stored by the memory 96 and subsequently retrieved by a controller (e.g., the processor 92) to determine temperature measurements for the cooking compartment 26. Alternatively, the processor 92 can receive the temperature signals from the temperature sensor(s) 94, determine temperature measurements for the cooking compartment 26 therefrom, and output the temperature measurements to the memory 96 for storage and subsequent retrieval. In either case, the temperature signals and/or temperature measurements for a prior time duration can be stored on a rolling basis.

In operation 504, the controller 92 receives a first temperature measurement $T_1$ for the cooking compartment 26 at a first time and a second temperature measurement $T_2$ for the cooking compartment 26 at a second time, subsequent to the first time. The first temperature measurement $T_1$ can represent the oldest stored temperature measurement while the second temperature measurement $T_2$ can represent the newest stored temperature measurement. In alternative embodiments, the first temperature measurement can represent a stored temperature measurement between the oldest and newest stored temperature measurements.

In operation 506, the controller 92 compares the second temperature $T_2$ to the temperature threshold T. The temperature threshold T represents a boundary temperature for the temperature of the cooking compartment 26 between two different operating regimes. For second temperatures $T_2$ below the threshold temperature T, modification of the stored first heating time for given user input is not necessary to avoid overcooking. In contrast, for second temperatures $T_2$ above the threshold temperature T, modification of the stored first heating time for given user input (e.g., one of the stored second plurality of heating times in lieu of the stored first heating time) is necessary to avoid overcooking. The second temperature $T_2$ is used for comparison with the temperature threshold as it is the most recent temperature measurement, and therefore most representative of the temperature of the cooking compartment 26 at the time of the comparison.

Accordingly, if the controller 92 determines that the temperature threshold T is less than (or alternatively less than or equal to) the second temperature $T_2$, the method 500 moves from operation 506 to operation 510. In operation 510, the controller 92 commands a power supply to supply electrical power to the one or more heating elements 78, 80 for the stored first time period. That is, under this condition, the stored first heating time can be used without fear of overcooking because, at the start of the cooking cycle, the temperature of the cooking compartment 26, as approximated by the second temperature $T_2$, is relatively low.

The operations 506-510 can be summarized as: $T_2 \le T$: Heating time=stored first heating time.

In contrast, if the controller 92 determines that the temperature threshold T is greater than (or alternatively greater than or equal to) the second temperature $T_2$, the method 500 moves from operation 506 to operation 512. Under this condition, one of the stored second plurality of heating times is used, rather than the stored first cooking temperature, reflecting that the cooking compartment is too high to employ the stored first cooking temperature.

Following operation 512, the controller 92 identifies a suitable one of the plurality of stored second heating times for use. The temperature of the cooking compartment 26 discussed above provides an instantaneous characterization of the thermal environment of the cooking compartment 26 but no information regarding dynamic effects, such as how the temperature of the cooking compartment 26 is changing with time. These dynamic effects can be significant when the temperature of the cooking compartment 26 is relatively high at the start of a cooking cycle. By determining the stored second heating time based upon dynamic effects (e.g., temperature change as discussed below), the shade of food items cooked (e.g., toasting) using back-to back heating cycles in quick succession can be more consistent.

Notably, when performing multiple cooking cycles in back-to-back succession, the one or more heating elements 78, 80 have thermal mass and may continue to heat the cooking compartment 26 even when not activated (no power directed to the one or more heating elements 78, 80). Thus, the temperature of the cooking compartment 26 may be increasing. A hot cooking compartment 26 getting hotter indicates that the cooking compartment 26 may continue to get hotter and evaporate moisture from the food item more quickly, leading to faster cooking (e.g., defrosting, toasting, etc.) Conversely, for the same starting temperature, the hot cooking compartment 26 getting colder indicates that the cooking compartment 26 may continue to get colder and evaporate moisture from the food item less rapidly than the example above, leading to slower cooking by comparison (but still more rapidly than when the cooking cycle starts when the cooking compartment 26 is cold).

Accordingly dynamic temperature effects are taken into account when determining a suitable stored second heating time, in operations 512 and onward. As illustrated in FIG. 5, in operation 512, the controller 92 determines a temperature change occurring over the monitored time, given by the difference $\Delta T_C$ between the first temperature $T_1$ and the second temperature $T_2$. The difference $\Delta T_C$ represents the change in temperature of the cooking compartment 26 resulting from heating during the prior cooking cycle and not due to the heating cycle which is to come.

Subsequently, in operation 514, the controller 92 identifies a stored second heating time from the plurality of stored second cooking temperatures by comparing the determined difference $\Delta T_C$ to the at least one temperature difference threshold $\Delta T$.

The at least one temperature difference threshold $\Delta T_C$ represents a boundary between different operating regions, each having a different second heating time. In general, when the difference $\Delta T_C$ is relatively large (e.g., large magnitude and positive sign), the cooking system 20 receives more heat from the prior cooking cycle than when the difference $\Delta T_C$ is relatively small (e.g., small magnitude and positive sign or any magnitude and negative sign). Thus, a suitable stored second heating time can be reduced by a larger amount as compared to the stored first heating time when $\Delta T_C$ is large and reduced by a smaller amount when the difference $\Delta T_C$ is relatively small. Accordingly, the at least one temperature difference threshold $\Delta T$ can provide respective boundaries defining different suitable stored second heating times. Comparing the at least one temperature difference threshold $\Delta T$ to the difference $\Delta T_C$ allows the controller 92 to identify a stored second heating time from the plurality of second heating times suitable to avoid overcooking.

Once the stored second heating time has been identified in operation 514, the method 500 moves to operation 516. In operation 516, the controller 92 commands the power supply to supply electrical power to the heating elements 78, 80 for the identified heating time.

Figure 6:
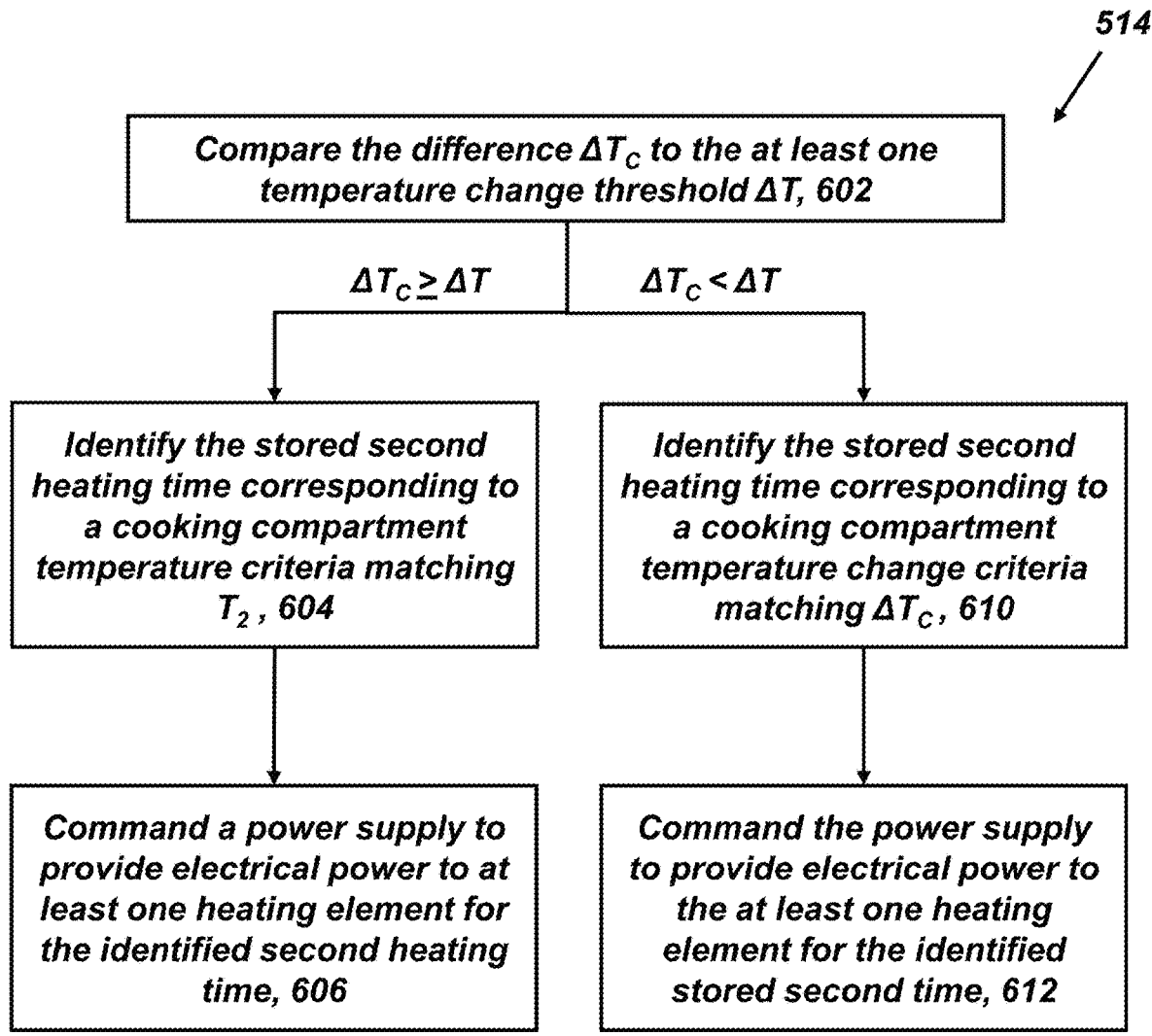
FIG. 6 is a flow diagram of a method of identifying a stored second heating time for the method of FIG. 5.

To further illustrate identification of the stored second heating time, the operation 514 is expanded in FIG. 6. As shown, in operation 602, the difference $\Delta T_C$ is compared to the at least one temperature change threshold $\Delta T$. When the controller 92 determines that the difference $\Delta T_C$ is greater than the at least one temperature change threshold $\Delta T$, the method 500 moves from operation 602 to operation 604. At least one of the stored second heating times maintained by the memory 96 can further correspond to a cooking compartment temperature criteria. In operation 604, the stored second heating time can be identified as a stored second heating time that corresponds to a cooking compartment temperature criteria that matches the second measured temperature $T_2$.

As an example, the cooking compartment temperature criteria can be one or more temperature ranges, each corresponding to a respective heating time. Embodiments of the respective heating times and corresponding cooking compartment temperature criteria are illustrated below.

Temperature A<$T_2$≤Temperature B: Heating time=Stored second heating time X

Temperature B<$T_2$≤Temperature C: Heating time=Stored second heating time Y $T_2$<Temperature C: Heating time=Stored second heating time Z where Temperature A<Temperature B<Temperature C and stored second heating time X>stored second heating time Y>stored second heating time Z. The second temperature $T_2$ can be considered to match a cooking compartment temperature criteria when the second temperature $T_2$ falls within a temperature range defined by the cooking compartment temperature criteria.

Notably, under circumstances where the difference $\Delta T_C$ is greater than the temperature change threshold $\Delta T$, the temperature change due to heat received from a prior cooking cycle can be significant. Furthermore, the temperature of the cooking compartment 26 can span a relatively large temperature range. As a result, a single heating time can be unsuitable for the entire temperature range of interest. Thus, by dividing this temperature range into respective cooking compartment temperature criteria, a suitable second heating time can be assigned to each.

Once the stored second heating time has been identified in operation 604, the method 500 moves to operation 606. In operation 606, the controller 92 commands the power supply to supply electrical power to the heating elements 78, 80 for the identified heating time.

Alternatively, when the controller 92 determines that the difference $\Delta T_C$ is less than (or less than or equal to) the at least one temperature change threshold $\Delta T$, the method 500 moves from operation 602 to operation 610. At least one of the stored second heating times maintained by the memory 96 can further correspond to a cooking compartment temperature change criteria. In operation 610, the stored second heating time can be identified as a stored second heating time that corresponds to a cooking compartment temperature change criteria that matches the measured cooking compartment temperature change $\Delta T_C$.

As an example, the cooking compartment temperature change criteria can be one or more temperature change ranges, each corresponding to a respective stored second heating time. Embodiments of the respective heating times and corresponding cooking compartment temperature change criteria are illustrated below.

Temperature Change F<$\Delta T_C$≤Temperature Change G: Heating time=Stored second heating time XX Temperature Change H<$\Delta T_C$≤Temperature Change F: Heating time=Stored second heating time YY $\Delta T_C$≤Temperature H: Heating time=Stored second heating time ZZ where Temperature Change H<Temperature change F<Temperature Change G and stored second heating time XX<stored second heating time YY<stored second heating time ZZ. The difference $\Delta T_C$ can be considered to match a cooking compartment temperature change criteria when the difference $\Delta T_C$ falls within a temperature change range defined by the cooking compartment temperature change criteria. Once the stored second heating time has been identified in operation 610, the method 500 moves to operation 612. In operation 612, the controller 92 commands the power supply to supply electrical power to the heating elements 78, 80 for the identified heating time.

As discussed above, embodiments of the one or more inputs 88 can be configured to allow the user to select a desired browning level or shade for the food item to be cooked. Examples of such browning levels can include alpha-numeric designations between a minimum and maximum, color description (e.g., white, light brown, medium brown, dark brown, black, etc.) In further embodiments, the one or more inputs 88 can be configured to allow the user to select a food item to be cooked (e.g., bread, bagel, etc.) In additional embodiments, the one or more inputs can be configured to allow the user to select a mode of operation (e.g., toast, bake, broil, defrost/warm, reheat, etc.)

Optionally, the stored first heating time and the plurality of stored second heating times maintained by the memory 96 can be further associated with one or more user input criteria (e.g., shade, food item, operation mode, etc.) Thus, stored first heating time in operation 510 can be a stored first heating time associated with a user input criteria that matches the user input. Additionally, identifying the stored second heating time in operations 514, 604, and 610 can further include identifying the stored first heating time or stored second heating time associated with a user input criteria that matches the user input.

In certain embodiments, the stored first and second heating times when bagels are selected as the food item can be increased as compared to when bread is selected as the food item, under otherwise equivalent cooking conditions (e.g., shade selection, mode of operation). This increase in the heating time is considered to be appropriate to account for one or more differences between bread and bagels that result in greater heat being required to raise the temperature of bagels by a given amount, as compared to bread. In one aspect, heat capacity of bagels can be greater than that of bread. In another aspect, the thickness of bagels can be greater than that of bread. In a further aspect, bagels can be toasted on a single side, rather than both sides, thus less heat may be delivered to bagels per unit time as compared to bread.

In further embodiments, the stored first and second heating times can be increased when selecting the defrost mode of operation, as compared to the toast mode of operation alone under otherwise equivalent cooking conditions (e.g., shade selection, food item, etc.) This increase in the heating time reflects an assumption that the defrost mode is being employed with a food item that is at a temperature less than room temperature (e.g., frozen or partially frozen). Thus, an increase in the heating time is considered appropriate to compensate. The magnitude of the heating time increase can be based upon the temperature of the cooking compartment 26 after insertion of the food item therein. As an example, the magnitude of the heating time increase can be larger when the temperature of the cooking compartment 26 (e.g., the second measured temperature $T_2$) is below the temperature threshold. Conversely, the magnitude of the heating time increase can be smaller when the temperature of the cooking compartment 26 (e.g., the second measured temperature $T_2$) is above the temperature threshold.

The controller 92 can employ Boolean logic to establish whether a user input matches a user input criteria. As an example, the user input and the user input criteria can be assigned an identifier (e.g., one or more alphanumeric characters) and compared to one another. A comparison output of TRUE can be considered a match, while a comparison output of FALSE can be considered to not be a match. In alternative embodiments, other techniques can be employed for determining whether or not a match is present.

Experimental Tests

A series of experiments were performed to evaluate embodiments of the food cooking systems and methods discussed herein. Each experiment was performed using the same user inputs (e.g., shade, food item, and operating mode) for 6 cooking cycles. Two food items were tested for each cooking cycle.

The temperature of the cooking compartment 26 at the start of at least some of the cooking cycles was different in order to evaluate whether or not the processor 92 adjusted the heating times to for these differences.

The cooking compartment temperature at the start of the cooking cycle 1 was approximately room temperature.

Cooking cycles 1, 2, 3, and 4 were performed back-to-back, with approximately no time between respective cooking cycles.

Cooking cycle 5 was performed approximately 30 seconds after cooking cycle 4.

Cooking cycle 6 was performed approximately 1 minute after cooking cycle 5.

Accordingly, the relative temperature of the cooking compartment 26 for the 6 cooking cycles was from lowest to highest:

cycle 1<cycle 6<cycle 5<cycle 2 ≈cycle 3≈cycle 4

Cooking cycle 1 had the lowest starting temperature of the cooking compartment 26, as it is the first test (cold start). Cooking cycles 2/3/4 had the highest starting temperature of the cooking compartment 26, and are approximately equal, as they were performed back-to-back. Cooking cycles 5 and 6 were performed after a delay with respect to the prior cooking cycle, resulting in cooling and a reduction in the starting temperature of the cooking compartment 26 as compared to cooking cycles 2, 3, and 4. However, the delay of cooking cycles 5 and 6 was not sufficiently large to reduce the starting temperature of the cooking compartment 26 to the level of cooking cycle 1. The starting temperature of the cooking compartment 26 in cooking cycle 6 was less than cooking cycle 5, as the delay prior to starting cooking cycle 6 was greater than the delay prior to starting cooking cycle 5. It can be further appreciated that, by performing tests with longer pauses between cooking cycles (e.g., on the order of minutes), the accuracy of this approach can be validated with greater confidence.

In these tests, it is desirable for the food items having the same user input to have a similar shade. Notably, as the starting temperature of the cooking compartment 26 for at least some the cooking cycles is different, achievement of a similar shade for the food items having the same user input indicates that the heating time has been suitably adjusted to compensate.

Test Procedure

Figure 7:
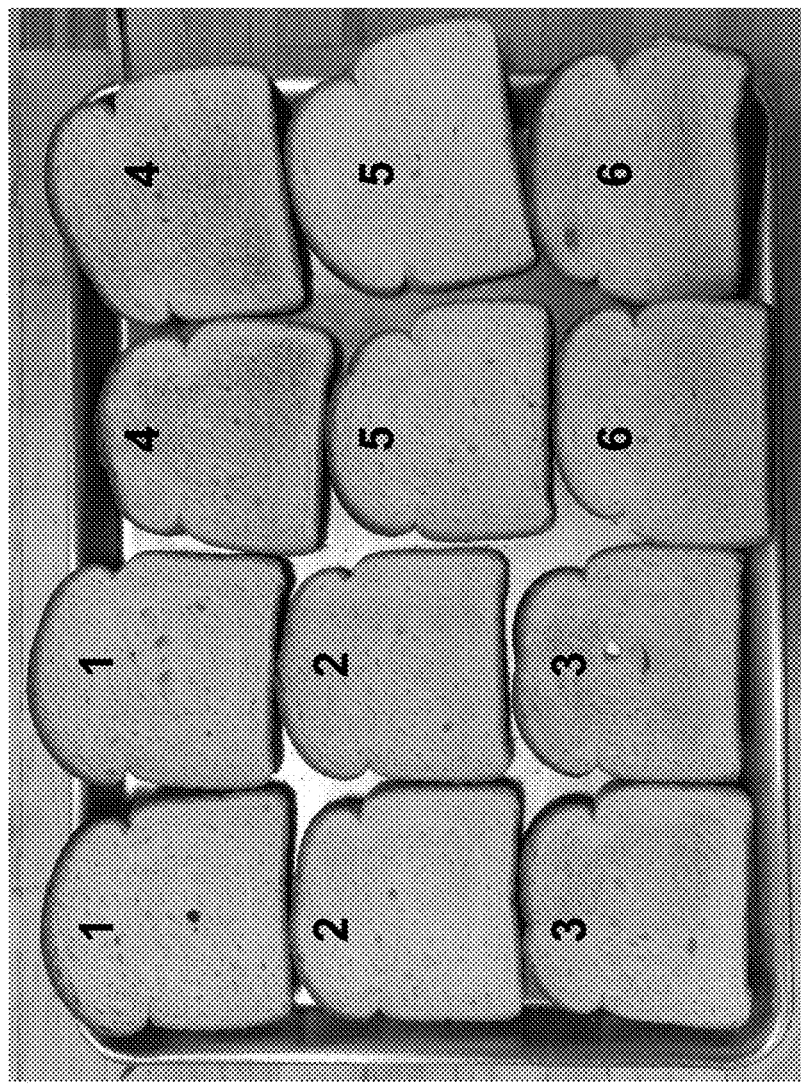
FIG. 7 is a photograph illustrating bread slices after cooking by the cooking system of FIG. 1 for a first experiment performed according to a first shade setting and a toast setting.
Figure 8:
FIG. 8 is a photograph illustrating bread slices after a first cooking experiment performed by the cooking system of FIG. 1 according to a second shade setting and the toast setting.
Figure 9:
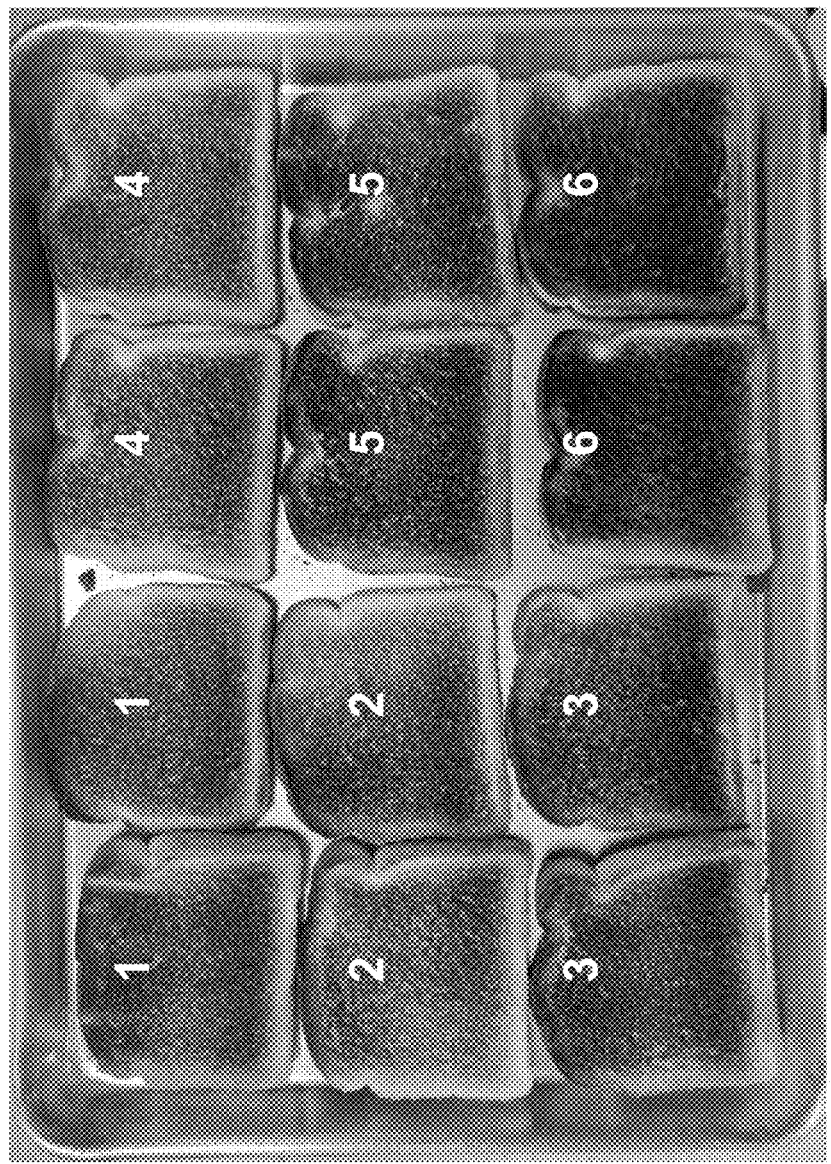
FIG. 9 is a photograph illustrating bread slices after a second cooking experiment performed by the cooking system of FIG. 1 according to a third shade setting and the toast setting.

FIGS. 7, 8, and 9 are photographs illustrating food items after cooking by the cooking system of FIG. 1. A first shade is selected for the first experiment of FIG. 7, a second shade is selected for the second experiment of FIG. 8, and a third shade is selected for the third experiment of FIG. 9. The user selected operating mode of toast and food item bread were further used for each of the first, second, and third experiments. The food item for each of the first, second, and third experiments were bread slices of nominally identical geometry and composition. As shown, two bread slices were used for each cooking cycle. The number of the cooking cycle is overlaid on the bread slices illustrated in FIGS. 7, 8, and 9, with cooking cycle 1 at the top left, cooking cycle 2 at the center left, cooking cycle 3 at the bottom left, cooking cycle 4 at the top right, cooking cycle 5 at the center right, and cooking cycle 6 at the bottom left.

Figure 10:
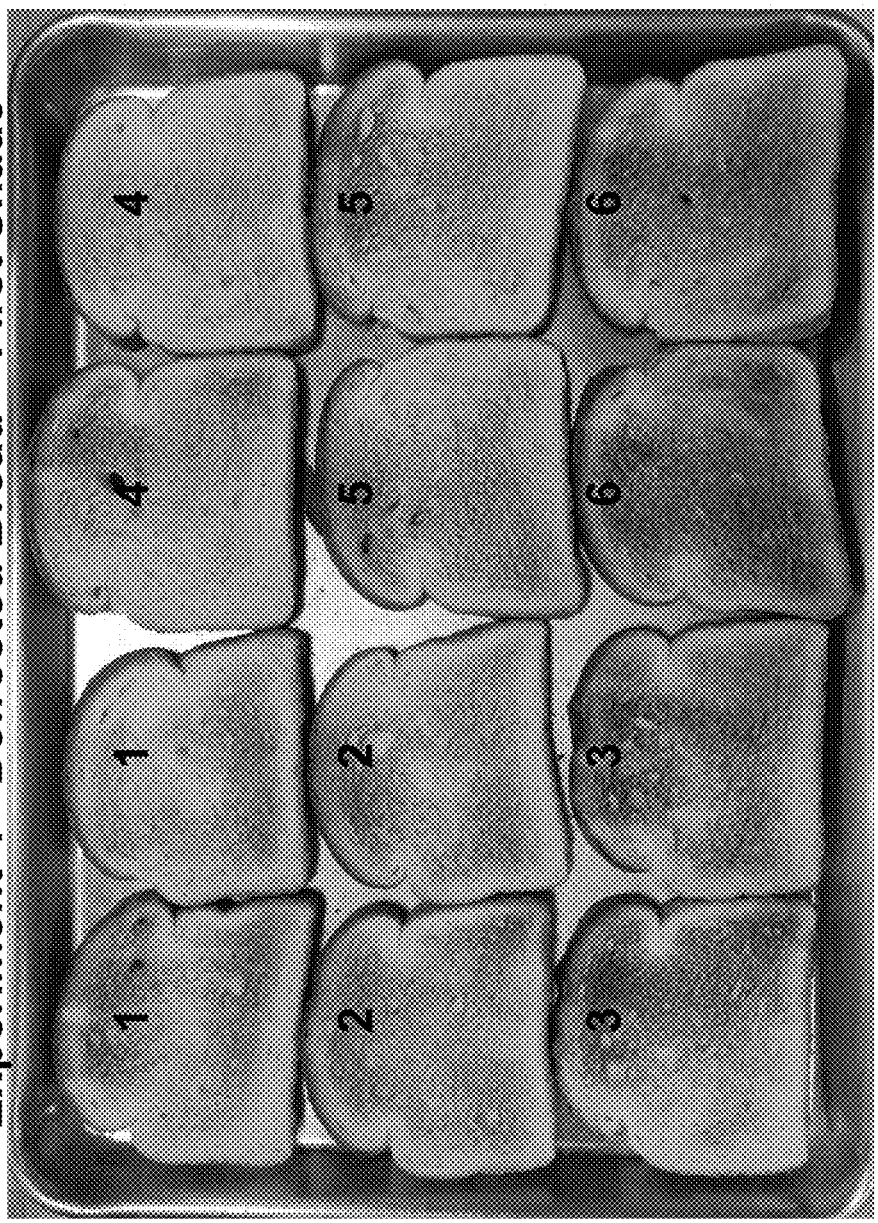
FIG. 10 is a photograph illustrating bread slices after a third cooking experiment by the cooking system of FIG. 1 according to the first shade setting, the toast setting, and a defrost setting.
Figure 11:
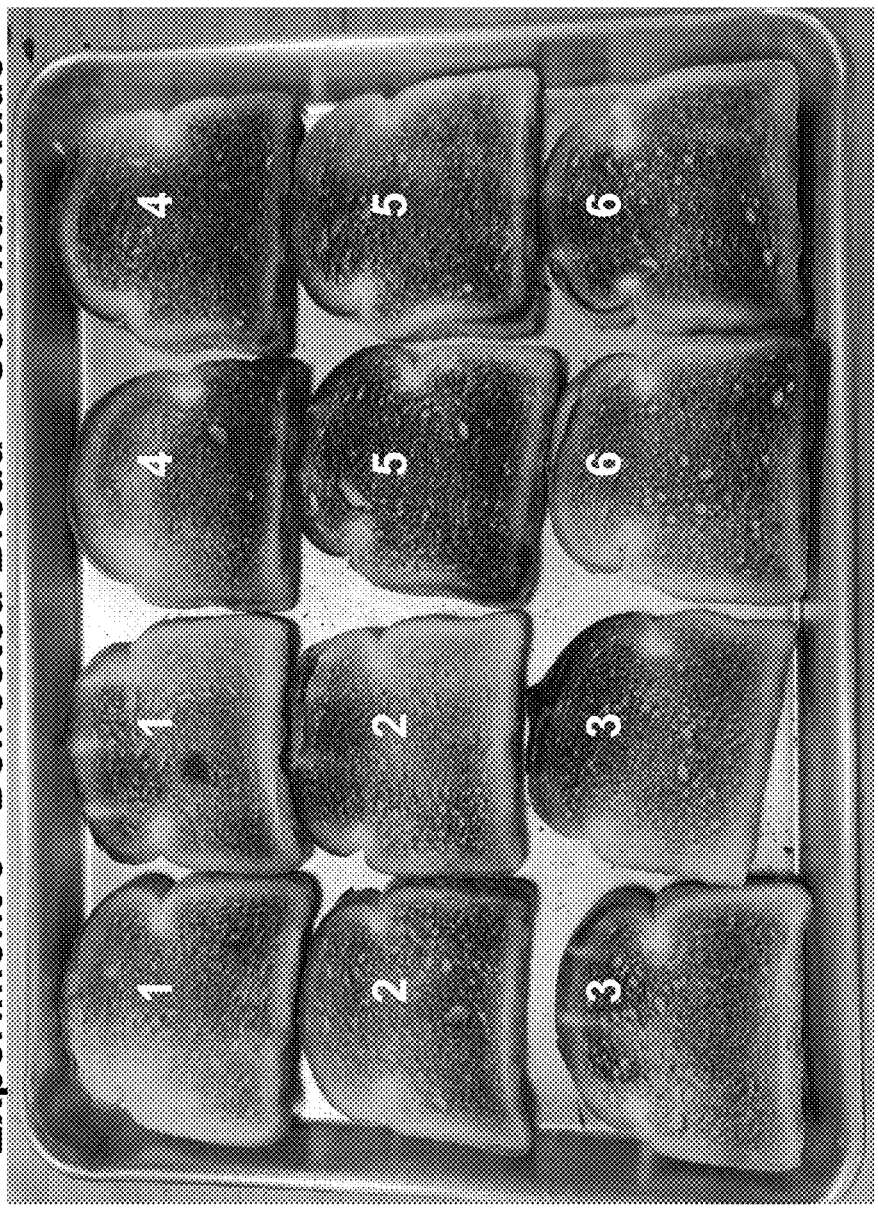
FIG. 11 is a photograph illustrating bread slices after a fifth cooking experiment by the cooking system of FIG. 1 according to the second shade setting, the toast setting, and the defrost setting.
Figure 12:
FIG. 12 is a photograph illustrating bread slices after a sixth cooking experiment by the cooking system of FIG. 1 according to the third shade setting, the toast setting, and the defrost setting.

FIGS. 10, 11, and 12 are photographs illustrating food items after cooking by the cooking system of FIG. 1 according to experiments 4, 5, and 6. The first shade is selected for the experiment 4 of FIG. 10, the second shade is selected for the experiment 5 of FIG. 11, and the third shade is selected for the experiment 6 of FIG. 12. The user selected operating modes of defrost and toast, and food item bread were further used for each of experiments 4-6. The food item for each of experiments 4-6 were bread slices of nominally identical geometry and composition. Thus, experiments 1-3 and experiments 4-6 differ only in their initial condition, being room temperature at the start of experiments 1-3 and frozen at the start of experiments 4-6.

Figure 13:
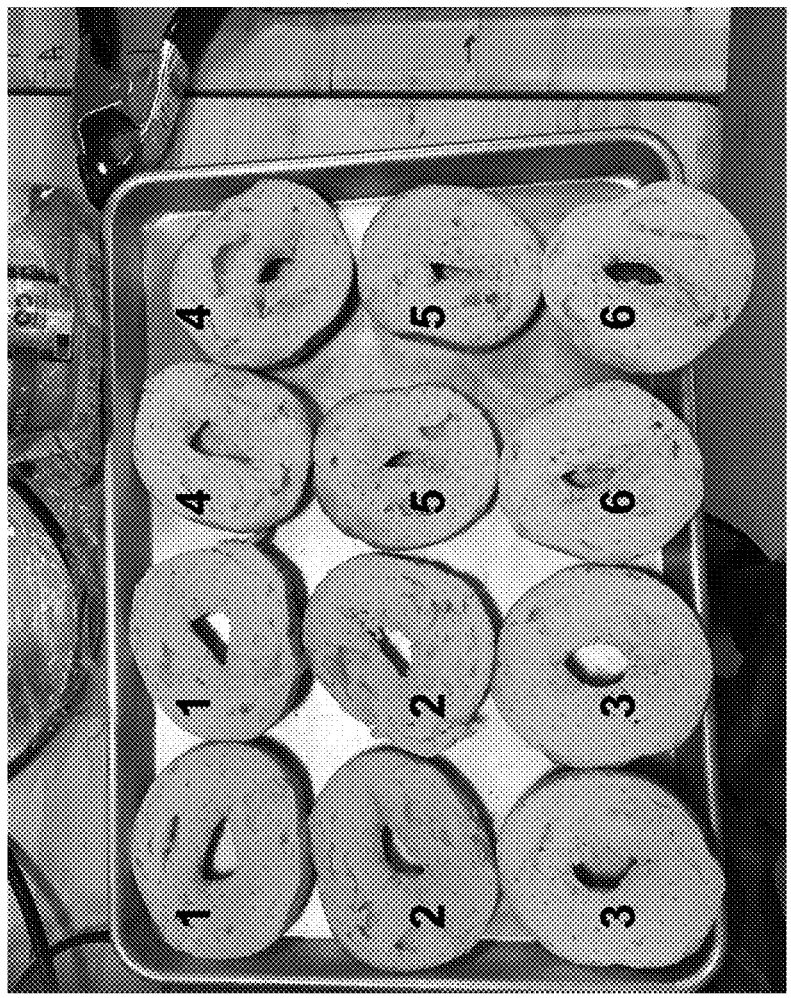
FIG. 13 is a photograph illustrating bread slices after a seventh cooking experiment by the cooking system of FIG. 1 according to the first shade setting and a bagel setting.
Figure 14:
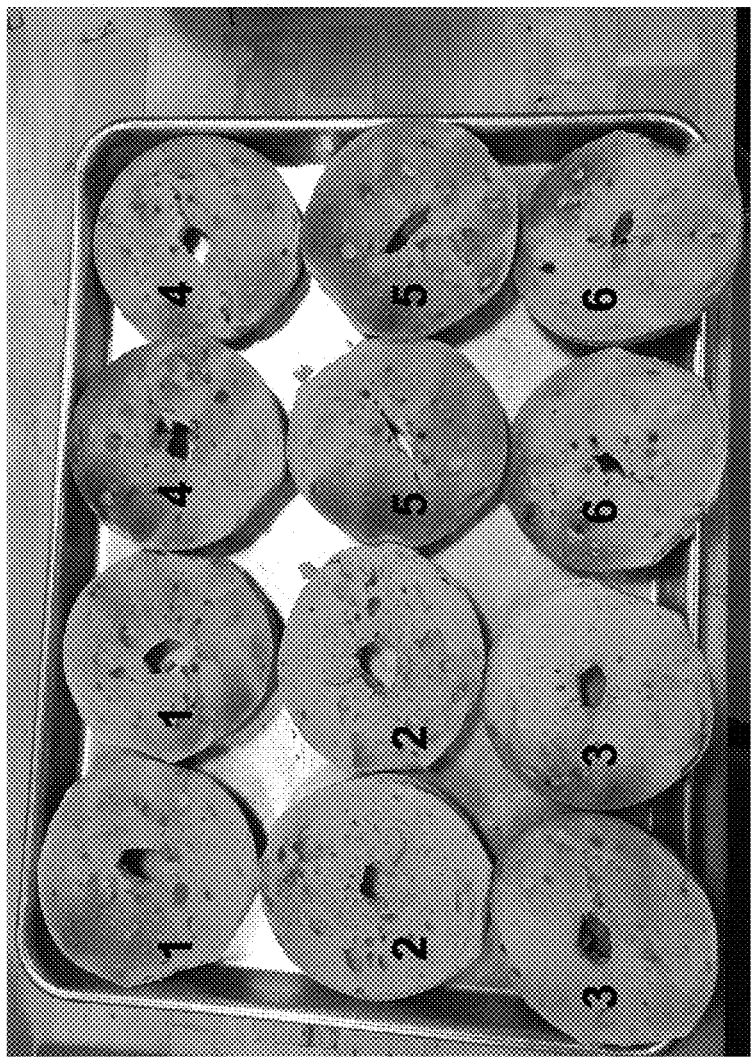
FIG. 14 is a photograph illustrating bread slices after an eighth cooking experiment by the cooking system of FIG. 1 according to the second shade setting and the bagel setting.
Figure 15:
FIG. 15 is a photograph illustrating bread slices after a ninth cooking experiment by the cooking system of FIG. 1 according to the third shade setting and the bagel setting.

FIGS. 13, 14, and 15 are additional photographs illustrating food items after cooking by the cooking system of FIG. 1 according to experiments 8, 9, and 10. The first shade is selected for experiment 7 of FIG. 13, the second shade is selected for experiment 8 of FIG. 14, and the third shade is selected for the experiment 9 of FIG. 15. The user selected operating mode of toast and food item bagel were further used for each of experiments 7-9. The food item for each of experiments 7-9 were bagel slices of nominally identical geometry and composition.

Accordingly, experiments 7-9 differ from experiments 1-3 in the food item. Experiments 7-9 differ from experiments 4-6 in their initial condition (room temperature vs. frozen) and food item.

Test Results

The following observations and corresponding conclusions are noted from the test results illustrated in FIGS. 7-15.

Observation 1—the degree of brown-ness is approximately constant within a given experiment, regardless of the starting condition of the food item (room temperature vs. frozen) or the food item itself.

Conclusion 1—embodiments of the disclosed systems and methods are selecting suitable heating times to compensate for the starting temperature of the cooking compartment 26.

Observation 2—the degree of brown-ness increases with shade level, regardless of the starting condition of the food item (room temperature vs. frozen) or the food item itself. Experiments 1, 4, and 7 (FIGS. 7, 10, and 13) for the first shade level exhibit the lowest degree of brown-ness. Experiments 2, 5, and 8 (FIGS. 8, 11, and 14) for the second shade level exhibit an increase in the degree of brown-ness. Experiments 3, 6, and 9 (FIGS. 9, 12, and 15) for the third shade level exhibit the highest degree of brown-ness.

Conclusion 2—embodiments of the disclosed systems and methods are selecting suitable heating times in response to user selection of the shade in combination with user selection of the food item and/or cooking mode (e.g., defrosting vs. toasting) to compensate for the starting temperature of the cooking compartment 26.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices). The processor and the memory can be supplemented by, or incorporated in, special purpose logic circuitry.

To provide for interaction with a user, the subject matter described herein can be implemented on a computer having a display device, e.g., an LCD (liquid crystal display), for displaying information to the user. User input devices can include, but are not limited to, physical and/or virtual objects, e.g., buttons, dials, keypads and the like, by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A cooking system, comprising:
a housing including a cooking compartment, configured to receive a food item therein, at least one heating element configured to heat the cooking compartment in response to receipt of electrical power from a power supply, and at least one temperature sensor configured to measure the temperature within the cooking compartment and to output temperature signals containing data representing the temperature measurement;
a control system in the housing including a controller including one or more processors in communication with the at least one temperature sensor, and the power supply, wherein the controller is configured to:
receive a first temperature signal representing a first measurement of the temperature of the cooking compartment at a first time,
receive a second temperature signal representing a second measurement of the temperature of the cooking compartment at a second time, subsequent to the first time,
compare the second temperature measurement to a stored temperature threshold;
if the second measured temperature is determined to be less than or equal to the temperature threshold, command the power supply to provide electrical power to the at least one heating element for a stored first heating time; and
if the second measured temperature is determined to be greater than the temperature threshold, command the power supply to provide electrical power to the at least one heating element for a stored second heating time less than the stored first heating time; and a memory maintaining the stored first heating time, a plurality of stored second heating times, the temperature threshold, and at least one temperature change threshold, wherein the controller is further configured to, if the second measured temperature is determined to be greater than the temperature threshold;
determine a difference between the second measured temperature and the first measured temperature, and
identify the stored second heating time from the plurality of stored second heating times by comparing the difference to the at least one temperature change threshold.

2. The cooking system of claim 1, wherein at least one of the plurality of stored second heating times corresponds to a cooking compartment temperature criteria, and wherein identifying the stored second heating time comprises:
determining that the difference is greater than the temperature change threshold, and
identifying the stored second heating time as the second heating time that corresponds to a cooking compartment temperature criteria matching the second measured temperature.

3. The cooking system of claim 1, wherein at least one of the plurality of stored second heating times corresponds to a cooking compartment temperature change criteria, and wherein identifying the stored second heating time comprises:
- determining that the difference is less than or equal to the temperature change threshold, and
- identifying the stored second heating time as the second heating time that corresponds to a cooking compartment temperature change criteria matching the difference.

4. The cooking system of claim 1, further comprising a shade selector configured to receive a selection of one of a plurality of shades, and wherein the controller is configured to receive, from the shade selector, a selected shade.

5. The cooking system of claim 4, wherein the stored first heating time comprises a plurality of stored first heating times, wherein at least one of the plurality of stored first heating times corresponds to a shade of the plurality of shades, and wherein the controller is further configured to, if the second measured temperature is less than or equal to the temperature threshold, command the power supply to provide electrical power to the at least one heating element for the stored first heating time corresponding to a shade matching the selected shade.

6. The cooking system of claim 4, wherein at least one of the plurality of stored second heating times corresponds to a cooking compartment temperature criteria and a shade, and wherein identifying the stored second heating time comprises:
- determining that the difference is greater than the temperature change threshold, and
- identifying the stored second heating time as the second heating time that corresponds to both a cooking compartment temperature criteria matching the second measured temperature and a shade matching the selected shade.

7. The cooking system of claim 4, wherein at least one of the plurality of stored second heating times corresponds to a cooking compartment temperature change criteria and a shade, and wherein identifying the stored second heating time comprises:
- determining that the difference is less than or equal to the temperature change threshold, and
- identifying the stored second heating time as the second heating time that corresponds to both a cooking compartment temperature change criteria matching the difference and a shade matching the selected shade.

8. The cooking system of claim 1, further comprising a food item selector configured to receive a selection of one of a plurality of food items to be cooked, and wherein the controller is configured to receive, from the food item selector, a food item selection.

9. The cooking system of claim 8, wherein the stored first heating time comprises a plurality of stored first heating times, wherein at least one of the plurality of stored first heating times corresponds to an food item of the plurality of food items, and wherein the controller is further configured to, if the second measured temperature is less than or equal to the temperature threshold, command the power supply to provide electrical power to the at least one heating element for the stored first heating time corresponding to a food item matching the selected food item.

10. The cooking system of claim 8, wherein at least one of the plurality of stored second heating times corresponds to a cooking compartment temperature criteria and a food item, and wherein identifying the stored second heating time comprises:
- determining that the difference is greater than the temperature change threshold, and
- identifying the stored second heating time as the second heating time that corresponds to both a cooking compartment temperature criteria matching the second measured temperature and a food item that matches the selected food item.

11. The cooking system of claim 8, wherein at least one of the plurality of stored second heating times corresponds to a cooking compartment temperature change criteria and a food item, and wherein identifying the stored second heating time comprises:
- determining that the difference is less than or equal to the temperature change threshold, and
- identifying the stored second heating time as the second heating time that corresponds to both a cooking compartment temperature change criteria matching the difference and a food item that matches the selected food item.

12. The cooking system of claim 1, wherein the controller is further configured to output the stored heating time commanded by the controller to the power supply to a display.

13. A cooking method, comprising:
- receiving, by a controller including one or more processors, a first temperature signal representing a first measurement of a temperature of a cooking compartment of a cooking system at a first time and a second temperature signal representing a second measurement of the temperature of the cooking compartment at a second time, subsequent to the first time;
- comparing, by the controller, the second temperature measurement to a stored temperature threshold;
- if the controller determines the second measured temperature to be less than or equal to the temperature threshold, commanding a power supply to provide electrical power to at least one heating element in thermal communication with the cooking compartment for a stored first heating time; and
- if the controller determines the second measured temperature to be greater than the temperature threshold, commanding the power supply to provide electrical power to the at least one heating element for a stored second heating time less than the stored first heating time; and
- storing in a memory the stored first heating time, a plurality of stored second heating times, the temperature threshold, and at least one temperature change threshold; wherein if the controller determines the second measured temperature to be greater than the temperature threshold;
- determining a difference between the second measured temperature and the first measured temperature, and identifying the stored second heating time from the plurality of stored second heating times by comparing the difference to the at least one temperature change threshold.

14. The cooking method of claim 13, wherein at least one of the plurality of stored second heating times corresponds to a cooking compartment temperature criteria, and wherein identifying the stored second heating time comprises:
- determining that the difference is greater than the temperature change threshold, and identifying the stored second heating time as the second heating time that corresponds to a cooking compartment temperature criteria matching the second measured temperature.

15. The method of claim 13, wherein at least one of the plurality of stored second heating times corresponds to a cooking compartment temperature change criteria, and wherein identifying the stored second heating time comprises:
   determining that the difference is less than or equal to the temperature change threshold, and
   identifying the stored second heating time as the second heating time that corresponds to a cooking compartment temperature change criteria matching the difference.

16. The cooking method of claim 13, further comprising receiving, by the controller, a shade selected from one of a plurality of shades.

17. The cooking method of claim 16, wherein the stored first heating time comprises a plurality of stored first heating times, wherein at least one of the plurality of stored first heating times corresponds to a shade of the plurality of shades, and wherein the method further comprises, by the controller:
   determining that the second measured temperature is less than or equal to the temperature threshold; and
   commanding the power supply to provide electrical power to the at least one heating element for the stored first heating time corresponding to a shade matching the selected shade.

18. The cooking method of claim 16, wherein at least one of the plurality of stored second heating times corresponds to a cooking compartment temperature criteria and a shade, and wherein the identifying the stored second heating time further comprises, by the controller:
   determining that the difference is greater than the temperature change threshold, and
   identifying the stored second heating time as the second heating time that corresponds to both a cooking compartment temperature criteria matching the second measured temperature and a shade matching the selected shade.

19. The cooking method of claim 16, wherein at least one of the plurality of stored second heating times corresponds to a cooking compartment temperature change criteria and a shade, and wherein identifying the stored second heating time further comprises, by the controller:
   determining that the difference is less than or equal to the temperature change threshold, and
   identifying the stored second heating time as the second heating time that corresponds to both a cooking compartment temperature change criteria matching the difference and a shade matching the selected shade.

20. The cooking method of claim 13, further comprising receiving, by the controller, a food item selection from a plurality of food items to be cooked.

21. The cooking method of claim 20, wherein the stored first heating time comprises a plurality of stored first heating times, wherein at least one of the plurality of stored first heating times corresponding to a food item of the plurality of food items, and wherein the controller is further configured to:
   determine that the second measured temperature is less than or equal to the temperature threshold; and
   command the power supply to provide electrical power to the at least one heating element for the stored first heating time corresponding to an article matching the selected article.

22. The cooking method of claim 20, wherein at least one of the plurality of stored second heating times corresponds to a cooking compartment temperature criteria and a food item, and wherein identifying the stored second heating time comprises, by the controller:
   determining that the difference is greater than the temperature change threshold, and
   identifying the stored second heating time as the second heating time that corresponds to both a cooking compartment temperature criteria matching the second measured temperature and a food item that matches the selected food item.

23. The cooking method of claim 20, wherein at least one of the plurality of stored second heating times corresponds to a cooking compartment temperature change criteria and a food item, and wherein identifying the stored second heating time comprises, by the controller:
   determining that the difference is less than or equal to the temperature change threshold, and
   identifying the stored second heating time as the second heating time that corresponds to both a cooking compartment temperature change criteria matching the difference and a food item that matches the selected food item.

* * * * *